J. W. WEINLAND.
ADJUSTABLE BRAKE HEAD.
APPLICATION FILED NOV. 28, 1914.
1,143,671.
Patented June 22, 1915.
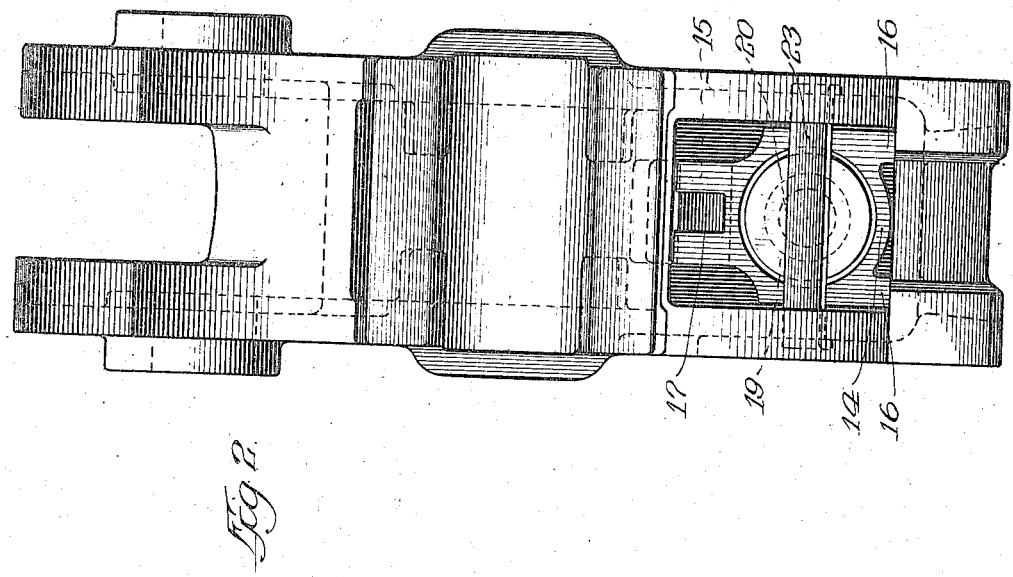
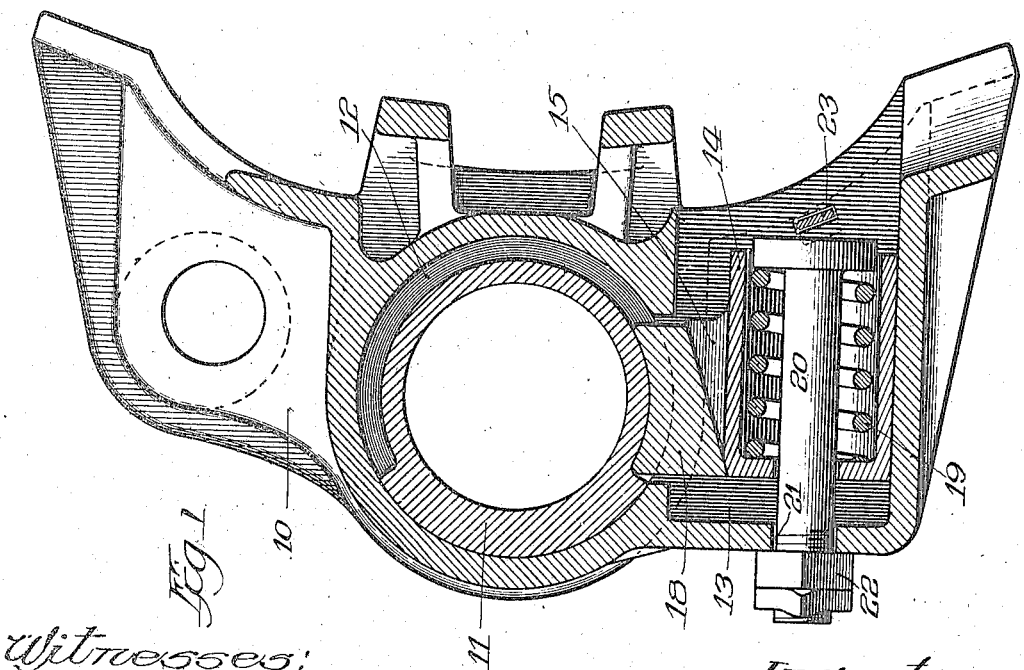

UNITED STATES PATENT OFFICE.

JOSEPH W. WEINLAND, OF CHICAGO, ILLINOIS, ASSIGNOR TO AMERICAN STEEL FOUNDRIES, OF NEW YORK, N. Y., A CORPORATION OF NEW JERSEY.

ADJUSTABLE BRAKE-HEAD.

1,143,671.  Specification of Letters Patent.  Patented June 22, 1915.

Application filed November 28, 1914. Serial No. 874,471.

*To all whom it may concern:*

Be it known that I, JOSEPH W. WEINLAND, a citizen of the United States, and resident of Chicago, in the county of Cook and State of Illinois, have invented certain new and useful Improvements in Adjustable Brake-Heads, of which the following is a specification.

My invention relates to brakes and has particular reference to a novel adjustable brake head for use in connection therewith.

In the patent to Fowler, No. 990,855, of May 2, 1911, a construction is disclosed which is quite similar to that herein illustrated, except in that the wedge members which secure the parts in locked engagement are positively held by screw means.

An object in the present construction is to improve the brake head there disclosed, by the provision of resilient means whereby the wedge members shall be forced into engagement and maintained in such engagement without the possibility of becoming loose, due to limited wear, which has been found to be present in all devices wherein the locking element is positively advanced without the association therewith of spring means.

The construction will be more readily understood by referring to the accompanying drawings, wherein—

Figure 1 is a transverse vertical view through a brake head constructed in accordance with my invention, and Fig. 2 is a front elevation of the construction shown in Fig. 1.

Referring more particularly to the drawings, it will be seen that I may mount the head 10 on a sleeve 11 having an incomplete peripheral groove 12 therein. In the lower portion of the head I provide a recess 13 open at its forward end to the face of the head. Within such recess I mount a combined spring barrel and wedge member, consisting of a cylinder 14 with an integral inclined plane 15 on the top thereof. As shown in Fig. 2, the cylinder is so shaped as to provide legs or bottom flanges 16 which bear against the floor of the recess 13. The wedge portion 15 may be hollowed out as at 17 for lightness, if desired. Coöperating with the wedge portion 15 is a block 18 having an arcuate upper surface bearing against the sleeve 11, the upper edge of the block being normally seated within the groove 12. The lower surface of the block 18 is an inclined plane and coöperates with the similar surface of the member 15. Mounted within the cylinder 14 is a helical spring 19 and a bolt 20 mounted concentrically within the cylinder, its head bearing against the spring. The bolt projects through an opening 21 in the brake head and is engaged outside the head by a suitable nut 22 by means of which the bolt may be drawn up, force being exerted on the spring and transmitted to the wedge members, the resultant of the force being a line directed toward the axis of rotation of the head. In order to prevent the accidental withdrawal of either the bolt or the cylinder, I provide a transverse key 23. With the key in position it will be seen that the wedge member 18 will not be allowed to descend sufficiently to be disengaged from the groove 12 in the sleeve, and that, therefore, even though the nut 22 should become lost or spring 19 broken, the head would still be held in place on the sleeve. It will be noted also that even though the nut 22, should become lost or loosened, the locking means would still be effective inasmuch as the key 23, would maintain the spring under a certain degree of compression.

By means of the construction shown, the parts are wedged securely in position through a spring force, and, therefore such spring will compensate for any wear and prevent the possibility of the head becoming loose in service.

I claim:

1. In a device of the class described, the combination of a bearing having a peripheral groove, a head rotatably mounted on said bearing, said head being provided with a recess in its lower portion, a pair of wedge members mounted in said recess, one of said members normally coöperating with said bearing in said groove, a spring mounted in one of said wedge members, and a bolt acting on said spring and tending to advance said wedge members into engagement with said bearing, substantially as described.

2. In a device of the class described, the combination of a bearing, a head rotatably mounted on said bearing, said head having a recess in its lower portion, a pair of wedge members mounted in said recess, one of said members being hollow, a spring mounted in said hollow wedge member, and a bolt acting on said spring and tending to force said wedge members into engagement with said bearing, substantially as described.

3. In a device of the class described, the combination of a bearing, a head rotatably mounted on said bearing, a pair of coöperating wedge members mounted in the lower portion of said head, a coil spring mounted internally of one of said wedge members, and a bolt acting on said spring and tending to advance said wedge members into engagement with the bearing, substantially as described.

JOSEPH W. WEINLAND.

Witnesses:
   CHAS. F. MURRAY,
   T. D. BUTLER.